United States Patent [19]

Curtindale

[11] Patent Number: 5,564,813
[45] Date of Patent: Oct. 15, 1996

[54] SUN VISOR LAMP

[75] Inventor: Edward G. Curtindale, Farmington Hills, Mich.

[73] Assignee: United Technologies Automotive, Inc., Dearborn, Mich.

[21] Appl. No.: 219,984

[22] Filed: Mar. 30, 1994

[51] Int. Cl.⁶ .............................. B60J 3/00; F21V 33/00; B60Q 3/00
[52] U.S. Cl. .......................... 362/83.1; 362/135; 362/137
[58] Field of Search .................................... 362/135, 137, 362/74, 83.1

[56] References Cited

U.S. PATENT DOCUMENTS

| | | |
|---|---|---|
| Re. 33,610 | 6/1991 | Lobanoff et al. . |
| Re. 33,631 | 7/1991 | Lobanoff et al. . |
| D. 317,430 | 6/1991 | Dowd et al. . |
| 3,211,903 | 10/1965 | McElreath ................ 362/141 |
| 3,614,211 | 10/1971 | Letter . |
| 3,926,470 | 12/1975 | Marcus .................... 296/97.5 |
| 4,000,404 | 12/1976 | Marcus .................... 362/135 |
| 4,075,468 | 2/1978 | Marcus .................... 362/144 |
| 4,174,864 | 11/1979 | Viertel et al. ............. 296/97.5 |
| 4,200,361 | 4/1980 | Malvano et al. . |
| 4,203,149 | 5/1980 | Viertel et al. ............. 362/144 |
| 4,213,169 | 7/1980 | Kempkers ................ 362/74 |
| 4,227,241 | 10/1980 | Marcus .................... 362/61 |
| 4,227,242 | 10/1980 | Marcus .................... 362/61 |
| 4,247,850 | 1/1981 | Marcus . |
| 4,272,118 | 6/1981 | Viertel et al. . |
| 4,353,592 | 10/1982 | Cziptschirsch . |
| 4,363,511 | 12/1982 | Viertel et al. . |
| 4,364,597 | 12/1982 | Viertel et al. . |
| 4,411,467 | 10/1983 | Cziptschirsch et al. . |
| 4,421,355 | 12/1983 | Marcus . |
| 4,486,819 | 12/1984 | Marcus et al. . |
| 4,491,899 | 1/1985 | Fleming . |
| 4,494,789 | 1/1985 | Flowerday . |
| 4,511,954 | 4/1985 | Marcus et al. . |
| 4,541,663 | 9/1985 | Schwanitz et al. . |
| 4,558,899 | 12/1985 | Chu et al. . |
| 4,564,234 | 1/1986 | Kaiser et al. . |
| 4,570,990 | 2/1986 | Flowerday . |
| 4,586,788 | 5/1986 | Hansen . |
| 4,591,956 | 5/1986 | Majchrzak . |
| 4,635,994 | 1/1987 | Dietz et al. . |
| 4,648,011 | 3/1987 | Boote et al. . |
| 4,652,982 | 3/1987 | Flowerday . |
| 4,683,522 | 7/1987 | Viertel et al. . |
| 4,690,508 | 9/1987 | Jacob . |
| 4,720,132 | 1/1988 | Ebert et al. . |
| 4,721,310 | 1/1988 | Gavagan et al. . |
| 4,726,656 | 2/1988 | Schofield et al. . |
| 4,734,831 | 3/1988 | Keyser et al. . |
| 4,760,503 | 7/1988 | VandenBerge et al. . |
| 4,807,093 | 2/1989 | Cisler . |
| 4,820,022 | 4/1989 | Demura et al. . |
| 4,820,933 | 4/1989 | Hong et al. . |
| 4,847,737 | 7/1989 | VanOrder et al. . |
| 4,879,637 | 11/1989 | Clark et al. . |
| 4,910,648 | 3/1990 | Van Order et al. ....... 362/135 |
| 4,912,607 | 3/1990 | Kosci et al. .............. 362/74 |
| 4,917,477 | 4/1990 | Bechtel et al. . |
| 4,997,228 | 3/1991 | Kempkers . |
| 5,003,438 | 3/1991 | Yoshida . |
| 5,014,169 | 5/1991 | Chetwynd . |
| 5,022,699 | 6/1991 | Yoshida . |
| 5,061,003 | 10/1991 | Gabas . |
| 5,061,004 | 10/1991 | Happich et al. . |
| 5,067,764 | 11/1991 | Lanser et al. . |
| 5,078,445 | 1/1992 | VandenBerge et al. . |
| 5,117,337 | 5/1992 | Sakuma . |
| 5,128,799 | 7/1992 | Byker . |
| 5,135,279 | 8/1992 | Beatty . |
| 5,143,678 | 9/1992 | Prillard . |
| 5,160,203 | 11/1992 | Viertel et al. ............. 362/144 |
| 5,162,950 | 11/1992 | Suman et al. . |
| 5,197,777 | 3/1993 | Lanser et al. . |
| 5,202,788 | 4/1993 | Weppner . |
| 5,203,623 | 4/1993 | Viertel et al. . |
| 5,204,778 | 4/1993 | Bechtel . |
| 5,205,635 | 4/1993 | Van Order et al. . |
| 5,278,693 | 1/1994 | Theiste et al. . |
| 5,278,736 | 1/1994 | Falcoff et al. ............. 362/141 |
| 5,282,077 | 1/1994 | Byker . |

Primary Examiner—Denise L. Gromada
Assistant Examiner—Sara Sachie Raab
Attorney, Agent, or Firm—Harness, Dickey & Pierce, P.L.C.

[57] ABSTRACT

A sun visor lamp provides courtesy illumination when the sun visor is in its stowed position.

25 Claims, 4 Drawing Sheets 5,564,813

SUN VISOR LAMP

BACKGROUND OF THE INVENTION

The present invention relates generally to sun visors and specifically to a lamp disposed in an automotive vehicle sun visor.

Vanity mirror lamps have long been employed in automotive vehicle sun visors. These traditional vanity mirror lamps provide one or more light bulbs and lenses adjacent to the periphery of a mirror. The illuminated vanity mirror assemblies are usually covered by a sliding or pivotable lid. A switch attached to the lid is commonly actuable to complete an electrical circuit thereby turning the light bulbs on and off. Examples of such conventional lamps are disclosed in the following U.S. Pat. Nos. 5,278,736 entitled "Automobile Sun Visor Vanity Mirror Module" which issued on Jan. 11, 1994 to Falcoff et al.; U.S. Pat. No. 4,760,503 entitled "Visor for a Vehicle" which issued on Jul. 26, 1988 to Vanden Berge et al.; 4,652,982 entitled "Illuminated Vanity Mirror Assembly" which issued on Mar. 24, 1987 to Flowerday; 4,364,597 entitled "Sun Visor for Vehicles Including a Mirror" which issued on Dec. 21, 1982 to Viertel et al; and, 4,227,242 entitled "Illuminated Visor Mirror Assembly" which issued on Oct. 7, 1980 to Marcus. While these vanity mirror lamps are primarily designed for illumination of a vanity mirror user's face, they can also be used as reading lamps when the sun visor is rotated against the windshield and the mirror lid is opened. However, the optical light dispersion pattern created by the lens fresnals specifically designed for face illumination would not efficiently and accurately direct the illumination to the optimum reading and courtesy positions, often forward of an occupant's lap.

Additionally, reading and courtesy lamps are commonly provided within center roof consoles of an automotive vehicle. The following U.S. patents show such lamps: U.S. Pat. Nos. 5,062,559 entitled "Overhead Console" which issued on Nov. 5, 1991 to Falcoff; and, 4,893,867 entitled "Console Mounted to a Headliner" which issued on Jan. 16, 1990 to Hilborn et al. While these reading/courtesy lamps are functionally beneficial, they are often difficult to package in an easily accessible location in front of the vehicle occupant when combined with open storage bins, sunglass storage bins, remote control garage door opener compartments, compasses and the like. Vehicles having a convertible roof or a sunroof provide further packaging difficulties for center console lamps and storage bins. For many convertible or sunroof vehicles, the reading/courtesy lamps must often be incorporated with a rearview mirror. The reflective surface of the rearview mirror, however, is detrimentally susceptible to vibration caused by the added lamp weight.

SUMMARY OF THE INVENTION

In accordance with the preferred embodiment of the present invention, a new and useful lamp is employed in an automotive vehicle sun visor. The lamp of the present invention has an illumination source disposed on a sun visor for providing courtesy illumination when the sun visor is in a stowed position. In one aspect of the present invention, the courtesy illumination source illuminates from a surface of the sun visor other than that retaining a vanity mirror. In a further aspect of the present invention, an illumination source provides both courtesy illumination and vanity mirror illumination. In another aspect of the present invention, an illumination source provides courtesy illumination, reading illumination and vanity mirror illumination.

The sun visor lamp of the present invention is advantageous over the prior art in that the present invention lamp combines multiple illumination functions within a single integrated unit. This sun visor lamp can provide vanity mirror illumination, courtesy illumination, reading illumination, or any combination thereof, from a common illumination source. Thus, the present invention is less expensive and less complex than the traditional separate sun visor mounted vanity mirror lamps and the center roof console lamps. Furthermore, the lamp of the present invention is more easily packaged within a convertible or sunroof vehicle. Accordingly, a storage bin or the like can be centrally mounted within a convertible or sunroof vehicle since the reading/courtesy lamps are located within the sun visor. Also, the present invention allows removal of the lamps from traditional rearview mirrors in convertible or sunroof vehicles thereby improving the vibrational performance thereof. Additional advantages and features of the present invention will become apparent from the following description and appended claims, taken in conjunction with the accompanying figures.

BRIEF DESCRIPTION OF THE DRAWINGS

FIG. 5 is a cross sectional view, taken along line 5—5 of FIG. 2, showing the present invention sun visor lamp;

DETAILED DESCRIPTION OF THE PREFERRED EMBODIMENT

Figure 1:
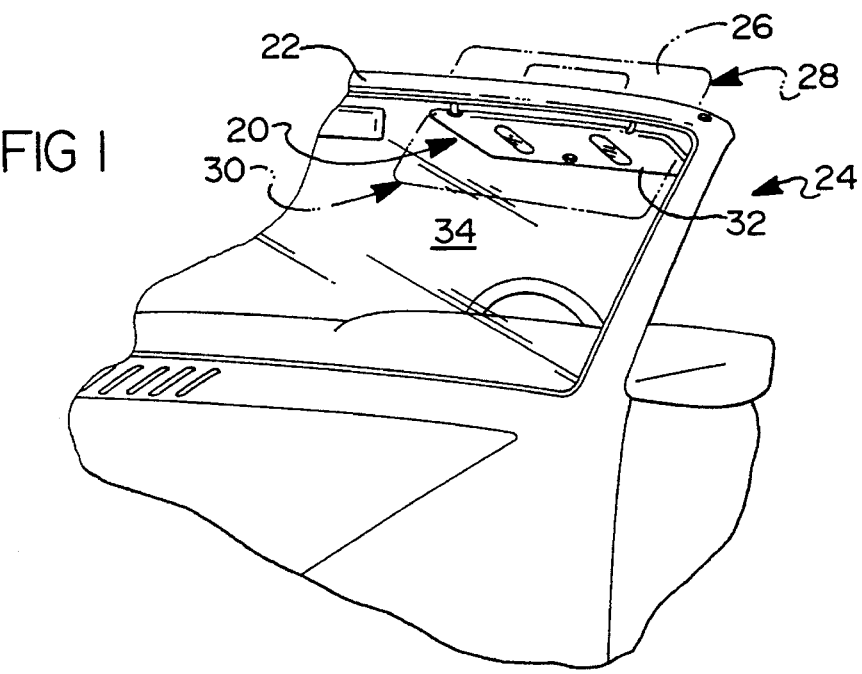
FIG. 1 is a perspective view showing the preferred embodiment of a sun visor lamp of the present invention in relation to an automotive vehicle.

Referring to FIG. 1, a pair of sun visors 20 having a lamp therein are rotatably mounted to a front header assembly 22 of an automotive vehicle 24. Thus, each sun visor 20 is rotatable from a stowed position 28 with a first surface 26 located against a lower garnish molding covering a bottom surface of front header assembly 22, to a functional sun-blocking position 30 wherein a second surface 32 of sun visor 20 is adjacent a windshield 34. Each sun visor 20 is also pivotable toward a side window.

Figure 2:
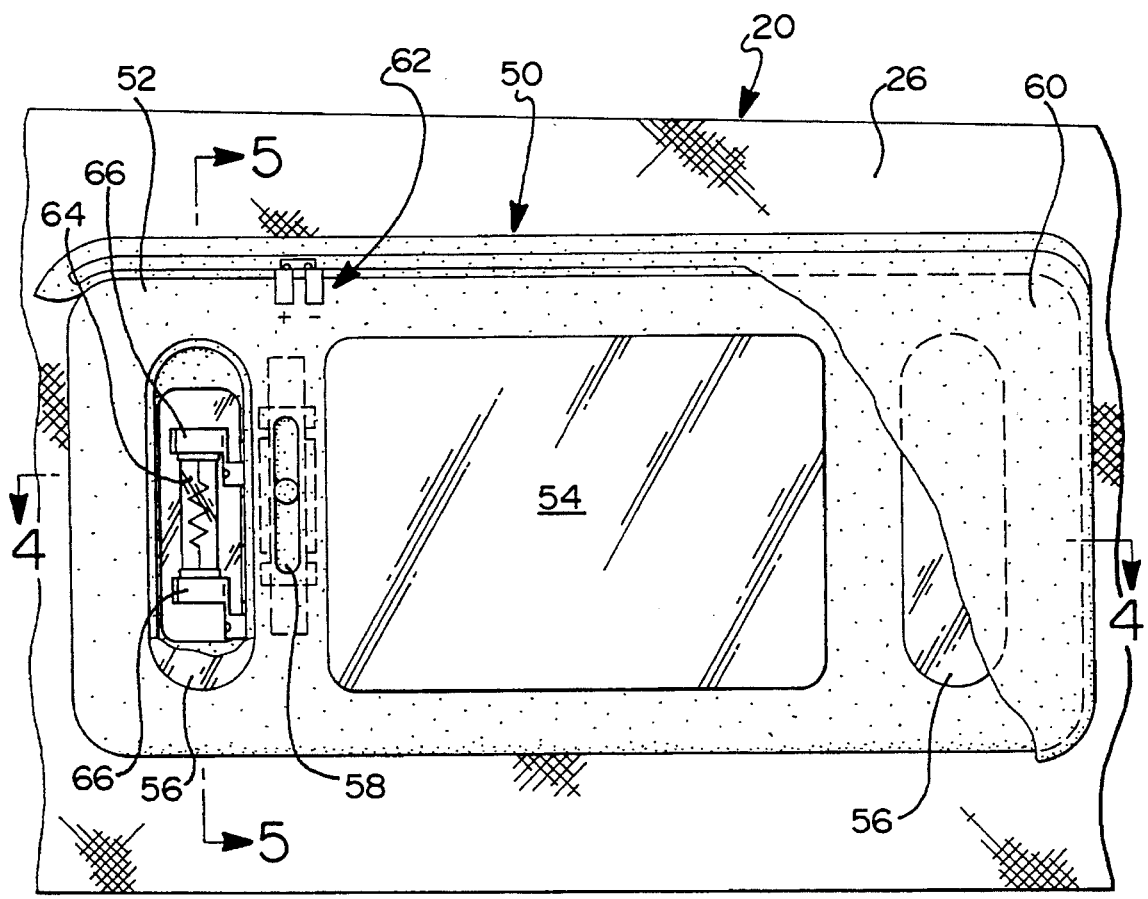
FIG. 2 is a true elevational view showing the present invention sun visor lamp of FIG. 1.
Figure 4:
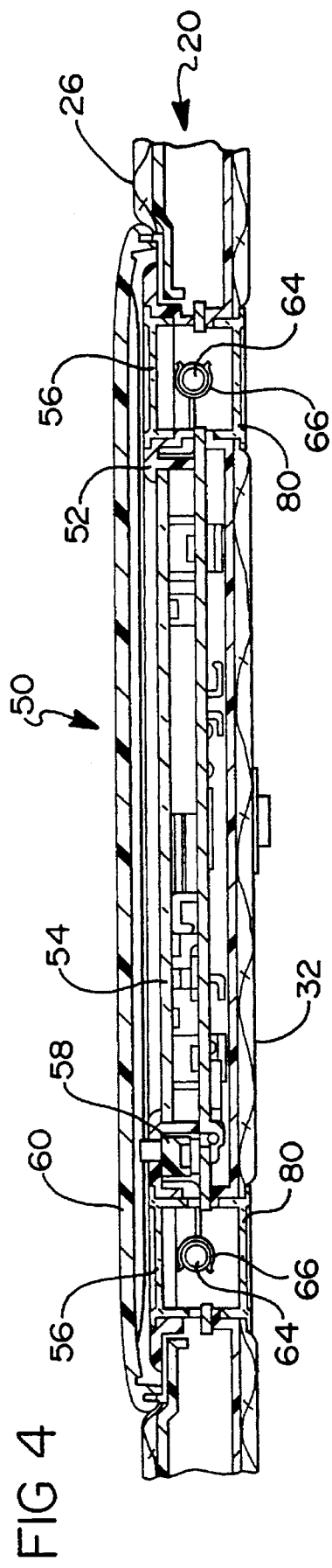
FIG. 4 is a cross sectional view, taken along line 4—4 of FIG. 2, showing the present invention sun visor lamp.

As can best be seen in FIGS. 2, 4 and 5, an illuminated vanity mirror assembly 50 is mounted to sun visor 20 proximate with first surface 26 thereof. Illuminated vanity mirror assembly 50 includes an aesthetic polymeric bezel 52, a reflective glass vanity mirror 54, a pair of lenses 56, a variable dimming electrical switch or potentiometer 58, a pivotable lid 60 and an on/off vanity illumination electrical switch 62. A fuse-type light bulb or illumination source 64 is mounted behind each lens 56 by a pair of conductive beryllium copper stampings 66. Such a vanity mirror assembly 50 is substantially made in accordance with the teachings disclosed within U.S. Pat. No. 5,278,736 to Falcoff et al. which is incorporated by reference herewithin. Of course, other illumination sources such as wedge base bulbs, electroluminescent lighting strips, fiberoptics, light piping or the like may alternately be employed with or without lenses.

Figure 3:
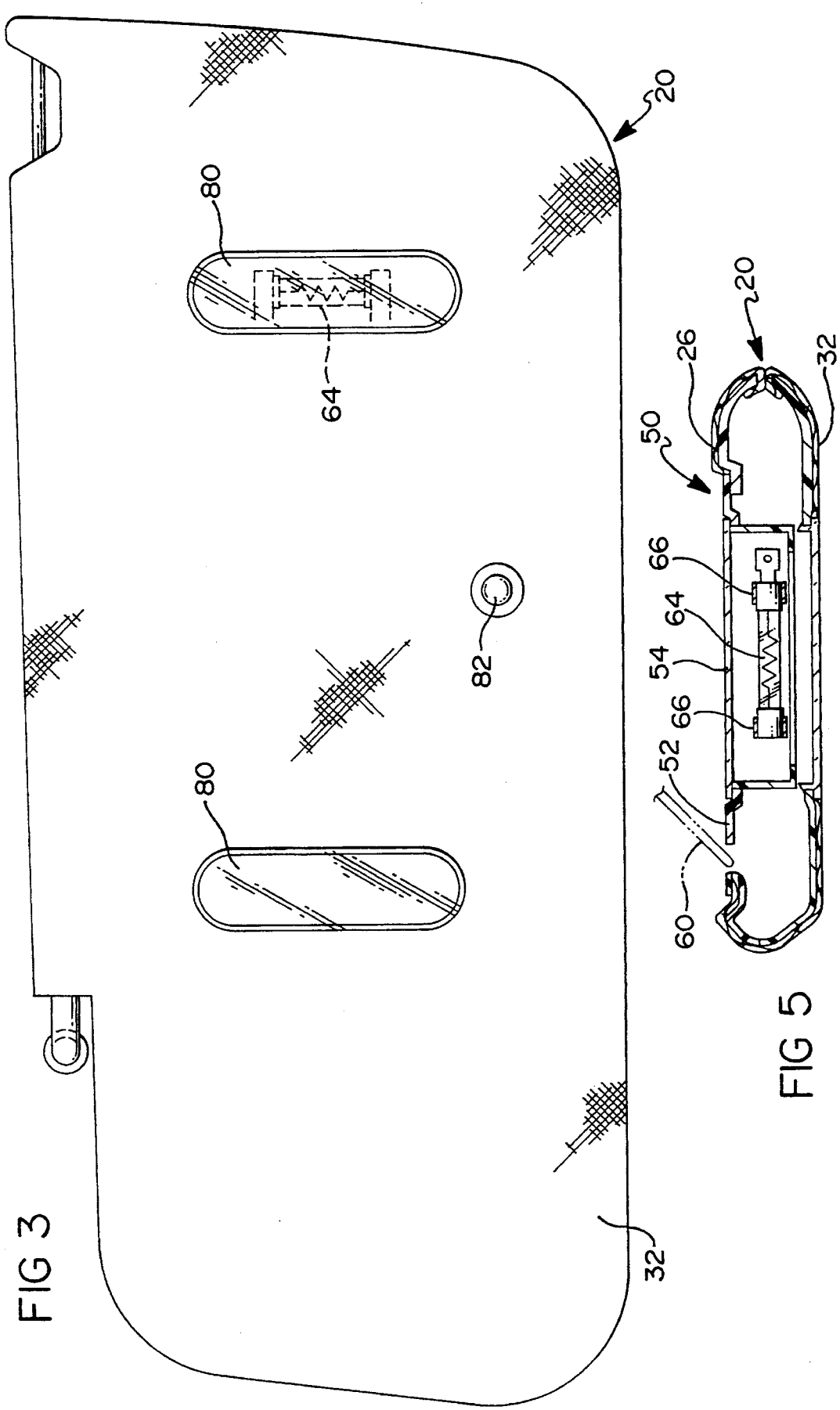
FIG. 3 is a true elevational view, taken opposite from that of FIG. 2, showing the present invention sun visor lamp of FIG. 1.

FIGS. 3, 4 and 5 illustrate second surface 32 of sun visor 20. A pair of lenses 80 are attached to second surface 32 by snap-fit engagement. Lenses 80 and 56 are preferably injection molded from heat resistant polycarbonate or acrylic polymeric resin. Lenses 80 are substantially aligned with lenses 56 oppositely disposed therefrom with each bulb 64 being centrally located therebetween. Also, a push/push electrical switch 82 is located on second surface 32 of sun visor 20. Switch 82 may alternately be a sliding, toggle, variable dimming or an electrochemical (eg., piezoelectric or the like) switch.

Figure 6:
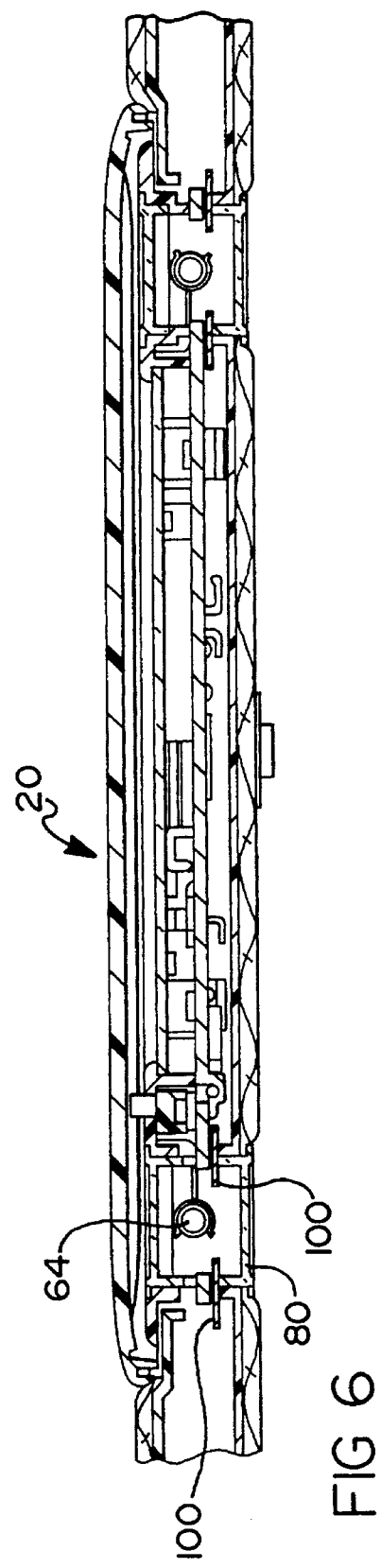
FIG. 6 is a cross sectional view, similar to that of FIG. 4, showing an alternate embodiment of the present invention sun visor lamp of FIG. 1.

An alternate embodiment of the present invention sun visor 20 is shown in FIG. 6. In this embodiment, a pair of polymeric shutters 100 are slidably located between each light bulb 64 and lens 80. Thus, illumination created by bulbs 64 can be selectively blocked from lenses 80 upon closure of shutters 100. Shutters 100 may be moved by a lever, cable, gear or electromagnetic force transmitting means. Of course, liquid crystal or electrochromatic shuttering could be used in place of the mechanical shuttering means shown.

Figure 7:
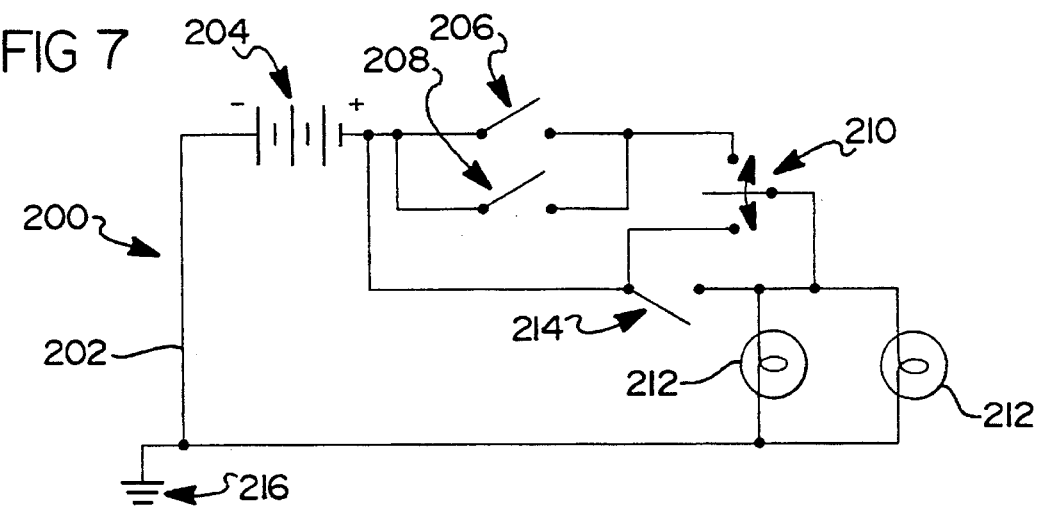
FIG. 7 is a circuit diagram of the preferred embodiment of the present invention sun visor lamp of FIG. 1 including reading, courtesy and vanity mirror illumination functions.

FIG. 7 discloses an electrical circuit 200 which allows 12 volt dc electrical current to flow through discrete conductive wires or stampings 202 from a battery or power source 204, through a pair of courtesy illumination switches, such as a door electrical switch 206 and an instrument panel mounted on/off switch 208 operating with a rheostat control, through a reading/courtesy illumination switch 210 and to a pair of light bulbs or illumination sources 212. Alternately, electric current flows from power source 204 through reading/courtesy illumination switch 210 and to illumination sources 212. A third electrical path flows electrical current from power source 204 through an on/off vanity mirror illumination switch 214 and to illumination sources 212. The vehicle body acts as a ground 216.

Figure 8:
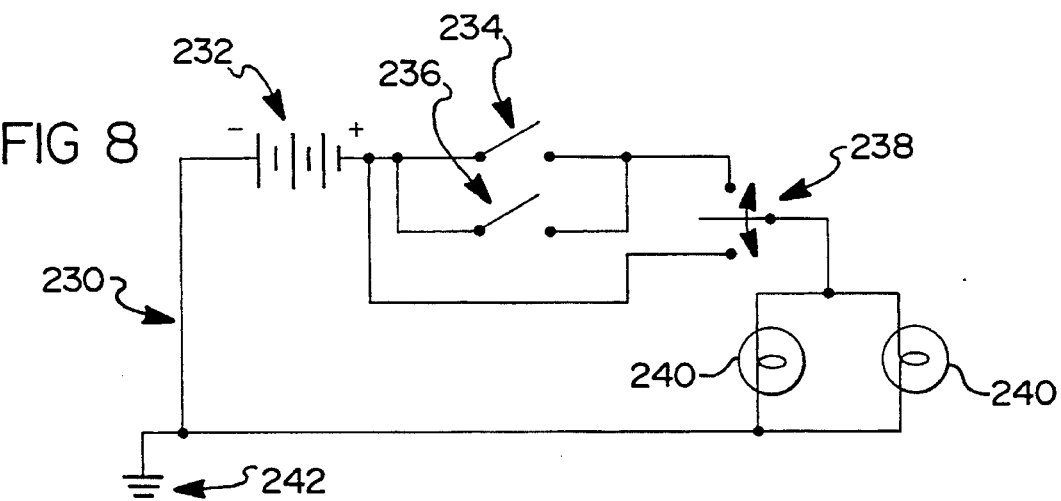
FIG. 8 is a circuit diagram of an alternate embodiment of the present invention sun visor lamp of FIG. 1 including reading and courtesy illumination functions.
Figure 9:
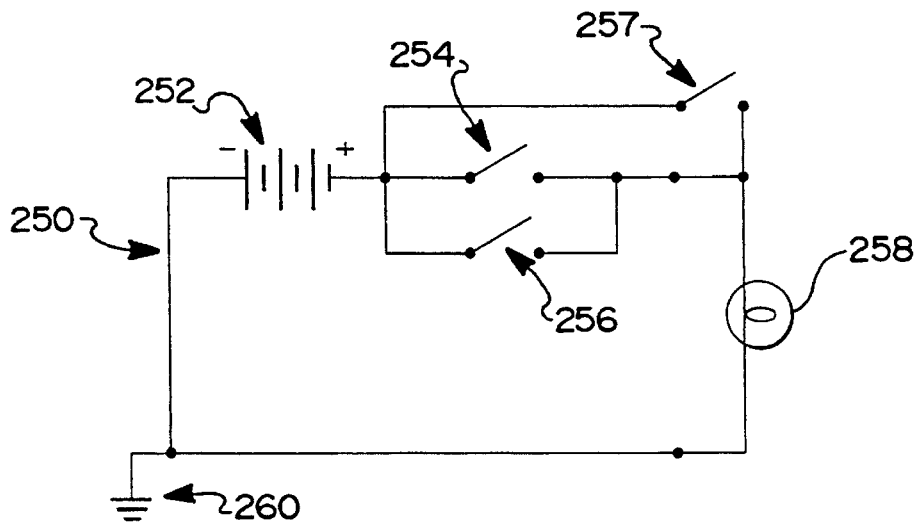
FIG. 9 is a circuit diagram of another alternate embodiment of the present invention sun visor lamp of FIG. 1 including courtesy and vanity mirror illumination functions.

An alternate embodiment electrical circuit 230 is shown in FIG. 8. Electrical circuit 230 provides a power source 232, a door operated courtesy illumination switch 234, an instrument panel mounted courtesy illumination switch 236, a reading/courtesy illumination switch 238, a pair of illumination sources 240 and a ground 242. FIG. 9 illustrates a third embodiment electrical circuit 250 including a power source 252, a door operated courtesy illumination switch 254, an instrument panel mounted courtesy illumination switch 256, an on/off vanity mirror illumination switch 257, a single illumination source 258 and a ground 260. A fourth electrical circuit (not shown) is essentially identical to that shown in FIG. 9 except vanity mirror illumination switch 257 is removed. Of course, one or more illumination sources may be employed within any of the aforementioned electrical circuits. Furthermore, additional switching means such as variable dimming potentiometers and redundant reading or courtesy illumination switches may be provided electrically in series or parallel within the sun visor or remotely.

Alternate current carrying means may be employed instead of the preferred discrete wires and stampings. For example, the electrical circuits of the present invention may use highly conductive printed ink circuits, printed circuit boards, fiberoptics, radiowaves, infrared energy or the like to transmit or carry electrical current between devices.

With reference to FIGS. 1 through 3, the lamp contained in sun visor 20 can be operated as follows. When first surface 26 of sun visor 20 is in stowed position 28, lenses 80 are visible to a vehicle occupant. Thus, when the occupant opens a door of the vehicle or actuates an instrument panel rheostat to a courtesy illumination position, courtesy illumination will be provided from bulbs 64 and through lenses 80 to somewhat flood the passenger compartment with light. Alternatively, the vehicle occupant can push reading illumination switch 82 to energize bulbs 64 thus providing reading illumination through lenses 80. Accordingly, lenses 80 have a specifically designed fresnel pattern molded therein for directing the illumination toward optimum reading and courtesy illumination targets. Subsequently, sun visor 20 can be rotated to its functional sunblocking position near windshield 34 such that the vehicle occupant can pivotably or slidably open lid 60 to expose vanity mirror 54. The opening of lid 60 causes bulbs 64 to provide vanity mirror illumination through lenses 56. Lenses 56 contain fresnel patterns thereon specifically designed to direct the illumination toward the occupant's face without creating shadows or bands of differing intensity light. If the embodiment shown in FIG. 6 is employed, shutters 100 will shut to prevent illumination from emanating through lenses 80 when sun visor 20 is in its functional sunblocking position.

The present invention is thus advantageous over the traditionally duplicative sun visor vanity mirror lamps and roof console reading/courtesy lamps. The present invention sun visor lamp replaces the many light bulbs, switches, housings, bezels, retainers and stampings with a single integrated sun visor lamp module. The present invention further frees up the front header or roof for packaging of storage bins, garage door opener receptacles, compass units or the like, This is especially advantageous for use in sunroof and convertible vehicles.

While the preferred embodiment of the sun visor lamp has been disclosed, it will be appreciated that various modifications may be made without departing from the present invention. For example, the reading/courtesy lenses may be disposed along an edge of the sun visor as long as they can transmit reading or courtesy illumination toward a vehicle passenger compartment when the sun visor is in its stowed position. Furthermore, a reading/courtesy lamp function may be incorporated within a sun visor not having a vanity mirror or vanity illumination. Moreover, an illumination source for emitting reading or courtesy illumination may be separate and remotely disposed from a vanity mirror illumination source. A sliding or track mounted sun visor may be employed in combination with the present invention lamp instead of the preferred pivoting sun visor disclosed herewithin. Additionally, the sun visor lamp of the present invention may be used in non-sunroof and non-convertible roof vehicles. Various materials have been disclosed in an exemplary fashion, however, a variety of other materials may of course be employed. It is intended by the following claims to cover these and any other departures from the disclosed embodiments which fall within the true spirit of this invention.

The invention claimed is:

1. A lamp disposed in a sun visor, a first surface of said sun visor stowable substantially adjacent to a header of an automotive vehicle, a second surface of said sun visor substantially exposed to view by an occupant of said automotive vehicle when said first surface of said sun visor is positioned in a stowed position, said lamp comprising an illumination source supported upon a substantially nonconductive member separate and displaced from a substrate upon which a reading illumination switch is mounted, said illumination source providing illumination from a plane defined by said second surface of said sun visor, a courtesy illumination switch electrically coupled to said illumination source, said illumination source providing courtesy illumination, reading illumination and vanity mirror illumination, said courtesy illumination actuable through energizing courtesy circuit means at least partially disposed within said sun visor to supply electrical current to said illumination source, said reading illumination actuable through energizing reading circuit means at least partially disposed within said sun visor including said reading illumination switch actuable to cause energization of said illumination source.

2. The lamp of claim 1 further comprising:

a first lens disposed on said first surface of said sun visor; and said illumination source juxtaposed substantially between said first lens and said plane defined by said second surface of said sun visor;

whereby illumination created by said illumination source can substantially pass through said first lens.

3. The lamp of claim 2 further comprising:

a vanity mirror juxtaposed adjacent to said first lens proximate with said plane of said first surface of said sun visor.

4. The lamp of claim 3 further comprising:

an electrical circuit selectively providing electrical current from a power source to said illumination source, said electrical circuit including a vanity mirror illumination switch.

5. The lamp of claim 4 further comprising:

a lid movably covering said vanity mirror.

6. The lamp of claim 5 wherein:

said vanity mirror illumination switch allows said electrical current to pass therethrough by opening said lid.

7. The lamp of claim 1 further comprising:

an electrical circuit selectively providing electrical current from a power source to said illumination source, said electrical circuit including said courtesy illumination switch.

8. The lamp of claim 7 wherein:

said electrical circuit further includes said reading illumination switch.

9. The lamp of claim 1 further comprising:

a second lens disposed on said plane defined by said second surface of said sun visor; and said illumination source juxtaposed substantially between said second lens and a plane defined by said first surface of said sun visor;

whereby said illumination created by said illumination source can substantially pass through said second lens.

10. The lamp of claim 9 further comprising:

shutter means for blocking said illumination through said second lens when said sun visor is moved to a second position thereof substantially adjacent a window of said automotive vehicle.

11. The lamp of claim 1 further comprising:

an electrical circuit selectively providing electrical current from a power source to said illumination source, said electrical circuit including said reading illumination switch.

12. The lamp of claim 11 wherein:

said reading illumination switch is defined as a push-push electrical mounted on said sun visor.

13. The lamp of claim 1 wherein:

said automotive vehicle has a retractable convertible roof.

14. The lamp of claim 1 wherein:

said automotive vehicle has a sunroof.

15. A lamp disposed completely on a blade of a sun visor, a first surface of said sun visor stowable substantially adjacent to a header of an automotive vehicle, a second surface of said sun visor substantially exposed to view by an occupant of said automotive vehicle when said first surface of said sun visor is positioned in a stowed position, said lamp comprising an illumination source positioned on said sun visor for selectively providing downwardly directed illumination when said sun visor is in said stowed position and without activation of a sun visor mounted switch, said illumination source also selectively providing downwardly directed illumination upon operation of a reading switch directly mounted to a pliable material covered substrate of said sun visor blade, an aesthetic bezel disposed against said pliable material and surrounding a button of said reading switch.

16. The lamp of claim 15 further comprising:

a first lens disposed on said first surface of said sun visor; and said illumination source juxtaposed substantially between said first lens and a plane defined by said second surface of said sun visor;

whereby illumination created by said illumination source can substantially pass through said first lens.

17. The lamp of claim 16 further comprising:

a vanity mirror juxtaposed adjacent to said first lens proximate with said plane of said first surface of said sun visor.

18. The lamp of claim 17 further comprising:

a vanity mirror illumination switch allowing electrical current to illuminate said illumination source upon opening a lid movably covering said vanity mirror.

19. The lamp of claim 15 further comprising:

a second lens disposed on a plane defined by said second surface of said sun visor; and said illumination source juxtaposed substantially between said second lens and a plane defined by said first surface of said sun visor;

whereby said illumination created by said illumination source can substantially pass through said second lens.

20. A lamp disposed in a sun visor, a first surface of said sun visor stowable substantially adjacent to a header of an automotive vehicle, a second surface of said sun visor substantially exposed to view by an occupant of said automotive vehicle when said first surface of said sun visor is positioned in a stowed position, said lamp comprising:

an illumination source positioned on a blade of said sun visor;

a first lens disposed on said first surface of said sun visor;

a second lens disposed on said second surface of said sun visor;

said illumination source juxtaposed substantially between said first lens and said second lens, whereby illumination created by said illumination source can pass through said first lens and whereby illumination created by said illumination source can pass through said second lens;

said illumination source actuable to provide downwardly directed illumination due to actuation of a courtesy switch remotely disposed from said sun visor;

a vanity mirror juxtaposed adjacent to said first lens and being proximate with a plane defined by said first surface of said sun visor;

a lid movably covering said vanity mirror;

a variable dimming switch mounted upon a vanity mirror bezel, said variable dimming switch being accessible from said first surface of said sun visor and being electrically connected to said illumination source;

said illumination source also actuable to provide downwardly directed illumination upon operation of a reading switch disposed on a surface of said sun visor other than that containing said vanity mirror, said reading switch being electrically connected to said illumination source; and said illumination source further actuable to provide illumination directed toward an occupant's face.

21. The lamp of claim 20 further comprising:

a vanity mirror illumination switch allowing electrical current to illuminate said illumination source upon opening said lid movably covering said vanity mirror.

22. A sun visor lamp comprising:

a blade of said sun visor having a first surface and an opposite generally flat second surface;

a vanity mirror unit mounted to said blade and being accessible from said first surface of said blade, a first lens mounted to a portion of said vanity mirror unit, an illumination source mounted to said vanity mirror unit;

a second lens directly attached to said second surface of said blade; and an electrical circuit selectively providing electrical current to said illumination source, said electrical circuit including a vanity mirror illumination switch and a separate reading illumination switch mounted on said blade of said sun visor so as to be exposed when said sun visor is in a stowed position.

23. The lamp of claim 22 wherein:

said electrical circuit further includes a courtesy illumination switch.

24. The lamp of claim 22 further comprising:

said illumination source juxtaposed substantially between said first lens and said second lens;

whereby illumination created by said illumination source can selectively and substantially pass through said first lens and second lens.

25. The lamp of claim 22 further comprising:

said vanity mirror illumination switch allowing electrical current to illuminate said illumination source upon opening a lid movably covering a vanity mirror.

* * * * *